(12) United States Patent
Alfieri et al.

(10) Patent No.: US 11,283,862 B2
(45) Date of Patent: Mar. 22, 2022

(54) APPARATUS AND METHOD FOR SUBSCRIPTION-BASED RESOURCE THROTTLING IN A CLOUD ENVIRONMENT

(71) Applicant: Telefonaktiebolaget LM Ericsson (publ), Stockholm (SE)

(72) Inventors: James Daniel Alfieri, Palmer Township, PA (US); Paula Tobey, Freehold, NJ (US); Robert V. DeLuca, Flemington, NJ (US); George Kuzman, Skillman, NJ (US); Paul Ballman, Monroe Township, NJ (US)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 16/897,047

(22) Filed: Jun. 9, 2020

(65) Prior Publication Data

US 2020/0304565 A1 Sep. 24, 2020

Related U.S. Application Data

(63) Continuation of application No. 15/844,377, filed on Dec. 15, 2017, now Pat. No. 10,721,294.

(Continued)

(51) Int. Cl.
*H04L 29/08* (2006.01)
*G06F 9/50* (2006.01)
(Continued)

(52) U.S. Cl.
CPC ...... *H04L 67/1008* (2013.01); *G06F 9/45533* (2013.01); *G06F 9/45558* (2013.01);
(Continued)

(58) Field of Classification Search
CPC . H04L 43/0876; H04L 47/125; H04L 47/788; H04L 12/1432; H04L 67/1008;
(Continued)

(56) References Cited

U.S. PATENT DOCUMENTS 7,657,580 B2 2/2010 Choquier et al.
7,805,516 B2 9/2010 Kettler et al.
(Continued)

OTHER PUBLICATIONS

AT&T Intellectual Property, "VNF Management Requirements for OpenECOMP," Revision 1.0 dated Feb. 1, 2017, Downloaded from <https://wiki.onap.org/download/attachments/1015849/VNF%20Management%20Requirements%20for%20OpenECOMP.pdf?api=v2> on Dec. 12, 2017, 31 pages.

(Continued)

*Primary Examiner* — Backhean Tiv
*Assistant Examiner* — Linh T. Nguyen
(74) *Attorney, Agent, or Firm* — Nicholson, De Vos, Webster & Elliott, LLP

(57) ABSTRACT

A method by a cloud orchestrator to provide subscription-based throttling of virtual applications in a cloud. The method includes determining that a physical resource in the cloud is being overutilized, identifying a virtual application running in the cloud that utilizes the physical resource, determining that the virtual application is to be throttled based on a determination that the virtual application is subscribed to a throttling subscription registry, where the throttling subscription registry specifies a throttling mechanism by which to throttle the virtual application, and executing the throttling mechanism to throttle the virtual application in response to a determination that the virtual application is to be throttled.

20 Claims, 7 Drawing Sheets

Related U.S. Application Data

(60) Provisional application No. 62/531,492, filed on Jul. 12, 2017.

(51) Int. Cl.

| | | |
|---|---|---|
| *G06F 9/455* | (2018.01) | |
| *H04L 12/24* | (2006.01) | |
| *H04L 12/927* | (2013.01) | |
| *H04L 67/1008* | (2022.01) | |
| *H04L 67/10* | (2022.01) | |
| *H04L 41/5022* | (2022.01) | |
| *H04L 41/5051* | (2022.01) | |
| *H04L 47/80* | (2022.01) | |
| *H04L 12/26* | (2006.01) | |
| *H04L 43/0817* | (2022.01) | |
| *H04L 41/50* | (2022.01) | |
| *H04L 43/16* | (2022.01) | |

(52) U.S. Cl.
CPC ......... *G06F 9/5072* (2013.01); *G06F 9/5083* (2013.01); *H04L 41/5022* (2013.01); *H04L 41/5051* (2013.01); *H04L 47/803* (2013.01); *H04L 67/10* (2013.01); *G06F 9/4555* (2013.01); *G06F 9/45545* (2013.01); *G06F 2009/45579* (2013.01); *G06F 2009/45595* (2013.01); *G06F 2209/504* (2013.01); *H04L 41/5096* (2013.01); *H04L 43/0817* (2013.01); *H04L 43/16* (2013.01)

(58) Field of Classification Search
CPC ............ H04L 41/5022; H04L 41/5051; H04L 47/803; H04L 67/10; H04L 41/5096; H04L 43/0817; H04L 43/16; H04L 47/70; H04L 47/822; G06F 2009/4557; G06F 9/505; G06F 9/45533; G06F 9/45558; G06F 9/5072; G06F 9/5083; G06F 9/45545; G06F 9/4555; G06F 2009/45579; G06F 2009/45595; G06F 2209/504; G06F 9/5011; G06F 9/50; G06F 9/5005; G06F 11/3442; G06F 2009/45533; G06F 2009/4558; G06F 2209/5083; G06F 2009/45575; G06F 2009/45562; H04W 28/08

See application file for complete search history.

(56) References Cited

U.S. PATENT DOCUMENTS

| | | | |
|---|---|---|---|
| 8,706,852 B2 * | 4/2014 | Kunze | G06F 9/5061 |
| | | | 709/221 |
| 9,231,869 B2 | 1/2016 | Kim et al. | |
| 9,405,597 B1 | 8/2016 | Luff et al. | |
| 9,678,785 B1 | 6/2017 | Bektas et al. | |
| 9,916,135 B2 | 3/2018 | Dube et al. | |
| 10,412,022 B1 * | 9/2019 | Tang | H04L 41/0896 |
| 10,574,554 B2 | 2/2020 | Lehner et al. | |
| 10,642,635 B2 * | 5/2020 | Holla | G06F 9/45558 |
| 2008/0114871 A1 * | 5/2008 | Biswas | H04L 61/256 |
| | | | 709/224 |
| 2011/0055385 A1 * | 3/2011 | Tung | H04L 43/16 |
| | | | 709/224 |
| 2013/0326529 A1 | 12/2013 | Augenstein et al. | |
| 2014/0058871 A1 * | 2/2014 | Marr | G06F 9/5022 |
| | | | 705/26.1 |
| 2014/0258446 A1 | 9/2014 | Bursell | |
| 2014/0282528 A1 | 9/2014 | Bugenhagen | |
| 2015/0074278 A1 * | 3/2015 | Maes | H04L 67/10 |
| | | | 709/226 |
| 2015/0095485 A1 | 4/2015 | Alatorre et al. | |
| 2015/0163288 A1 * | 6/2015 | Maes | H04L 67/42 |
| | | | 709/203 |
| 2015/0378765 A1 * | 12/2015 | Singh | G06F 9/50 |
| | | | 718/1 |
| 2016/0057075 A1 * | 2/2016 | Parikh | H04L 47/762 |
| | | | 709/226 |
| 2016/0099888 A1 | 4/2016 | Dunbar et al. | |
| 2016/0103717 A1 * | 4/2016 | Dettori | G06F 9/5072 |
| | | | 719/318 |
| 2016/0323377 A1 * | 11/2016 | Einkauf | H04L 29/0827 |
| 2017/0090996 A1 | 3/2017 | Birke et al. | |
| 2017/0168797 A1 * | 6/2017 | Pogrebinsky | G06F 8/65 |
| 2017/0277556 A1 * | 9/2017 | Ishii | G06F 16/1844 |
| 2017/0324633 A1 | 11/2017 | Lehner et al. | |
| 2017/0339158 A1 * | 11/2017 | Lewis | H04L 63/205 |
| 2017/0351873 A1 | 12/2017 | Luff et al. | |
| 2018/0173567 A1 | 6/2018 | Olshefski et al. | |
| 2018/0270832 A1 | 9/2018 | Meredith et al. | |
| 2018/0365075 A1 * | 12/2018 | Fang | G06F 9/50 |

OTHER PUBLICATIONS

IEEE Std 802.1QTM, 2012 Edition, "Media Access Control (MAC) Bridges and Virtual Bridged Local Area Networks," Institute of Electrical and Electronics Engineers, Inc. Standard for Local and metropolitan area networks, Dec. 2012, 1782 pages.

Non-Final Office Action, U.S. Appl. No. 15/844,377, dated Dec. 5, 2019, 16 pages.

Non-Final Office Action, U.S. Appl. No. 15/844,377, dated May 30, 2019, 14 pages.

Notice of Allowance, U.S. Appl. No. 15/844,377, dated Apr. 28, 2020, 21 pages.

* cited by examiner

| Virtual Application | Physical Resource and Threshold Level | Throttling Command |
|---|---|---|
| VAPP-100 | CPU Utilization Major Threshold | curl --data config-no-gui http://element-mgr-100/services/shutdown |
| VAPP-100 | CPU Utilization Critical Threshold | curl --data config-minimal http://element-mgr-100/services/shutdown |
| VAPP-300 | CPU Utilization Minor Threshold | ssh admin@198.22.54.90 /home/admin/shutdown_monitoring.sh |
| VAPP-300 | CPU Utilization Major Threshold | ssh admin@198.22.54.90 /home/admin/shutdown_webserver.sh |
| VAPP-300 | CPU Utilization Critical Threshold | /home/orchestrator/migrate-vm.sh VAPP-300 ${VMs} |

FIG. 2

APPARATUS AND METHOD FOR SUBSCRIPTION-BASED RESOURCE THROTTLING IN A CLOUD ENVIRONMENT

CROSS-REFERENCE TO RELATED APPLICATIONS

This application is a continuation of U.S. application Ser. No. 15/844,377, filed Dec. 15, 2017 (now U.S. Pat. No. 10,721,294, issued Jul. 20, 2020), which claims the benefit of U.S. Provisional Application No. 62/531,492, filed Jul. 12, 2017, which are hereby incorporated by reference.

TECHNICAL FIELD

The invention relates to the technical field of computer networks, and more specifically to managing resources in a cloud environment.

BACKGROUND

Typically, a cloud operator employs a cloud orchestrator to manage the lifecycle of virtual resources in a cloud. The functions of the cloud orchestrator include functions such as: implementing user requests to deploy new virtual resources, including virtual applications and virtual machines (VMs); tracking the virtual resources which have been deployed; monitoring the status of virtual resources and the physical resources (hardware) that is needed to support them; and taking action when faults or performance degradations occur.

Virtual applications are implemented using a group of one or more VMs that work together to perform certain high-level functions. The telecommunications industry uses the term Virtualized Network Functions, or VNFs, to refer to virtual applications used in such context. Virtual applications are commonly engineered to include redundant resources to provide high availability and to provide additional capacity to process user requests. For example, a web application might have multiple VMs (functioning as web servers) to which user requests can be seamlessly directed and processed. In times of high user volumes, the number of VMs might be increased to handle the additional workload (known as scaling out the virtual application) and the number of VMs might be decreased when the workload subsides (known as scaling in the virtual application).

The cloud orchestrator typically keeps track of the virtual resources that have been deployed. This may be achieved by maintaining an inventory of the virtual resources (e.g., within a database) or via dynamic queries to the virtual infrastructure managers that manage those virtual resources.

The cloud orchestrator also monitors/measures the performance of the physical resources. Performance can be measured in the form of individual metrics such as Central Processing Unit (CPU) utilization, memory utilization, and network bandwidth utilization. The cloud orchestrator may gather these metrics, compare them against configured thresholds, and generate an alarm or other notification when a threshold is violated.

When an alarm is generated indicating that a threshold has been violated, action must be taken, or the performance of the virtual applications may suffer. These actions might include scaling in some virtual applications to reduce the overall utilization of physical resources. By selecting the appropriate virtual applications to scale in, resources can be freed to meet the demands of more critical virtual applications. Other actions might include shutting down some processes running on the VMs (without completely shutting down the VMs) to reduce resource utilization.

One of the major tenets of cloud computing is the ability to share resources. Often times, cloud operators will choose to allocate the same physical resource to multiple virtual resources (sometimes referred to as "overallocation" of a physical resource) on the assumption that the physical resources will not be utilized by all (or a substantial number) of the virtual resources at the same time. When that assumption fails, there may be a spike in the utilization of a particular physical resource (e.g., a physical host's CPU or memory or bandwidth of a physical network). The VMs (and by extension, the virtual applications that are associated with those VMs) sharing that physical resource can suffer, meaning that they may not be able to take advantage of the physical resources that they believe are available to them. This may negatively affect their operation and the services that they can provide to their end users.

Cloud operators need a strategy to deal with such a situation. Conventional techniques may deal with such a situation via manual operator analysis and intervention. In addition, conventional techniques may use blunt methods which do not take into account the individual requirements and capabilities of the affected virtual applications.

SUMMARY

A method is implemented by a cloud orchestrator to provide subscription-based throttling of virtual applications in a cloud. The method includes determining that a physical resource in the cloud is being overutilized, identifying a virtual application running in the cloud that utilizes the physical resource, determining that the virtual application is to be throttled based on a determination that the virtual application is subscribed to a throttling subscription registry, where the throttling subscription registry specifies a throttling mechanism by which to throttle the virtual application, and executing the throttling mechanism to throttle the virtual application in response to a determination that the virtual application is to be throttled.

A network device implements a cloud orchestrator that provides subscription-based throttling of virtual applications in a cloud. The network device includes a non-transitory machine-readable storage medium having stored therein a throttling component and a set of one or more processors to execute the throttling component to cause the network device to determine that a physical resource in the cloud is being overutilized, identify a virtual application running in the cloud that utilizes the physical resource, determine that the virtual application is to be throttled based on a determination that the virtual application is subscribed to a throttling subscription registry, where the throttling subscription registry specifies a throttling mechanism by which to throttle the virtual application, and execute the throttling mechanism to throttle the virtual application in response to a determination that the virtual application is to be throttled.

A non-transitory machine-readable medium has computer code stored therein, which when executed by a set of one or more processors of a network device implementing a cloud orchestrator, causes the network device to perform operations for providing subscription-based throttling of virtual applications in a cloud. The operations include determining that a physical resource in the cloud is being overutilized, identifying a virtual application running in the cloud that utilizes the physical resource, determining that the virtual application is to be throttled based on a determination that the virtual application is subscribed to a throttling subscription registry, where the throttling subscription registry specifies a throttling mechanism by which to throttle the virtual application, and executing the throttling mechanism to throttle the virtual application in response to a determination that the virtual application is to be throttled.

BRIEF DESCRIPTION OF THE DRAWINGS

The invention may best be understood by referring to the following description and accompanying drawings that are used to illustrate embodiments of the invention. In the drawings:

FIG. 2 is a diagram of a table representing a throttling subscription registry, according to some embodiments.

DETAILED DESCRIPTION

Figure 1:
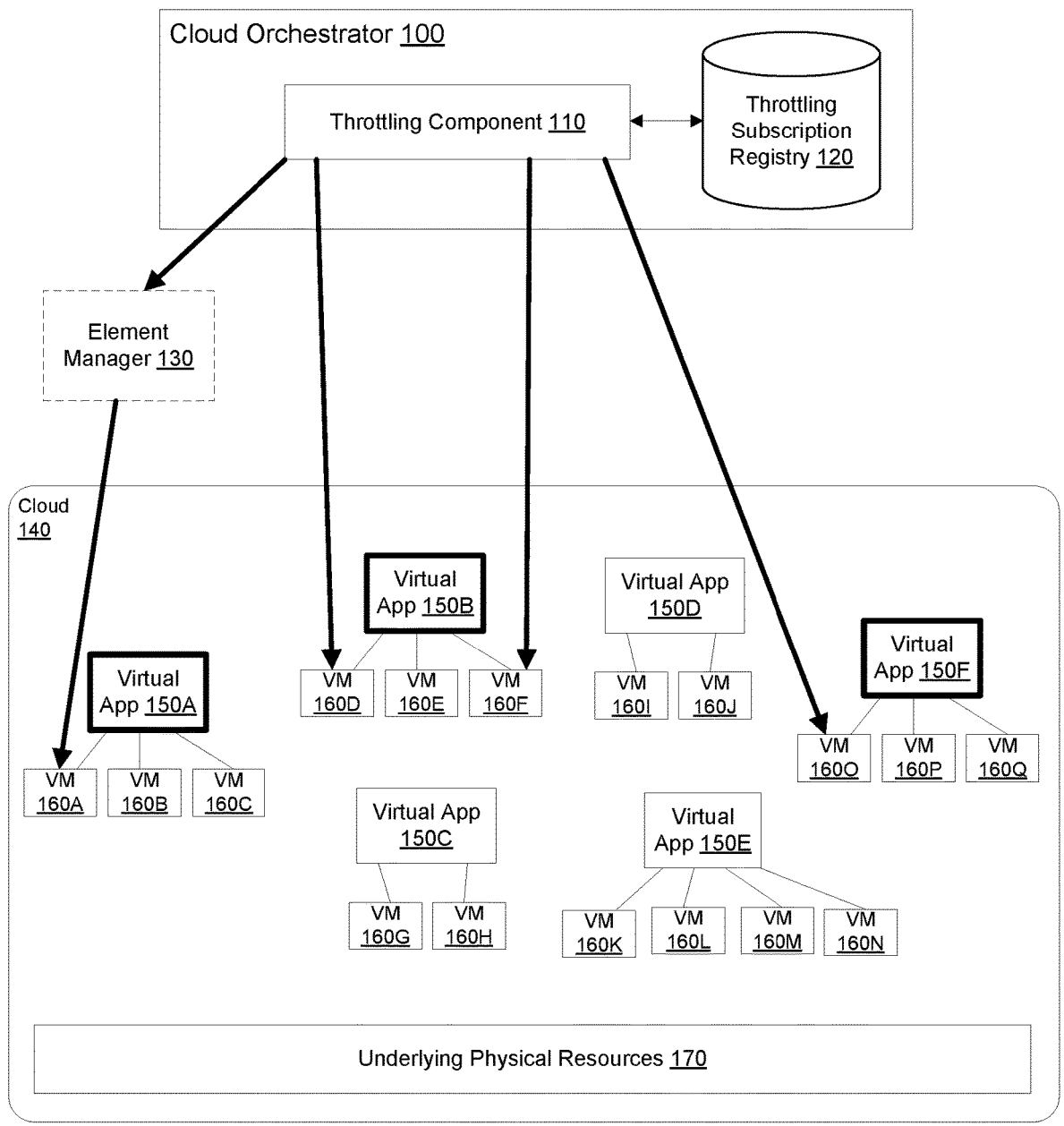
FIG. 1 is a block diagram of an environment in which subscription-based throttling of virtual applications can be implemented, according to some embodiments.

The following description describes methods, apparatus, and systems for providing subscription-based throttling of virtual applications. According to some embodiments, owners of virtual applications can voluntarily subscribe one or more of their virtual applications to a throttling subscription registry to allow those virtual applications to be throttled in the event that physical resources in a cloud are being overutilized. If a cloud orchestrator determines that a particular physical resource is being overutilized, the cloud orchestrator identifies a virtual application running in the cloud that utilizes that physical resource. The cloud orchestrator then determines whether the virtual application is to be throttled based on whether that virtual application is subscribed to the throttling subscription registry. If the virtual application is subscribed to the throttling subscription registry, the throttling subscription registry may specify a throttling mechanism by which to throttle that virtual application. If the cloud orchestrater determines that the virtual application is to be throttled, then the cloud orchestrator executes the specified throttling mechanism to throttle the virtual application. Other embodiments are further described herein.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to certain embodiments. However, such notation should not be taken to mean that these are the only options or optional operations, and/or that blocks with solid borders are not optional in certain embodiments.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors (e.g., wherein a processor is a microprocessor, controller, microcontroller, central processing unit, digital signal processor, application specific integrated circuit, field programmable gate array, other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of receiving data from other electronic devices over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate via wire through plugging in a cable to a physical port connected to a NIC. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

FIG. 1 is a block diagram of an environment in which subscription-based throttling of virtual applications can be implemented, according to some embodiments. As shown in the diagram, the environment includes a cloud 140 and a cloud orchestrator 100. The cloud 140 is operable to provide cloud computing services. Cloud computing services provide shared resources, software, and information to computers and other electronic devices upon request. In cloud computing environments, applications can be accessed over a network (e.g., the internet and/or a private/internal/corporate network). Cloud computing typically involves over-the-network provision of dynamically scalable and often virtualized resources. As shown in the diagram, the cloud 140 includes virtual applications 150A-F, where each virtual application 150 is implemented using a group of one or more virtual machines 160 (VMs) that work together to perform high-level functions. As shown in the diagram, virtual application 150A is implemented using VMs 160A-C, virtual application 150B is implemented using VMs 160D-F, virtual application 150C is implemented using VMs 160 G-H, virtual application 150D is implemented using VMs 160 I-J, virtual application 150E is implemented using VMs 160K-N, and virtual application 150F is implemented using VMs 160 O-Q. As used herein, a VM 160 is said to be associated with a virtual application 150 if it is used to implement the virtual application 150, and that VM 160 is said to be associated with the virtual application 150. In one embodiment, one or more of the virtual applications 150 are virtualized network functions (VNFs). The virtual applications 150 and their associated VMs 160 run on top of a set of underlying physical resources 170. These physical resources 170 could include, for example, central processing unit (CPU) resources, memory/storage resources, and/or network resources. While embodiments are described where virtual applications 150 are implemented using VMs 160, it should be understood that the virtual applications 150 can be implemented using other types of virtual resources or software containers.

The cloud orchestrator 100 is operable to manage the lifecycle of virtual resources in the cloud 140, which includes keeping track of the virtual resources (including virtual applications 150 and VMs 160) deployed in the cloud 140. As shown in the diagram, the cloud orchestrator 100 includes a throttling component 110 communicatively coupled to a throttling subscription registry 120. The throttling component 110 is a component of the cloud orchestrator 100 that is responsible for throttling virtual applications 150 and performing other functionality related to throttling. While the throttling component 110 is shown as being implemented in the cloud orchestrator 100, in other embodiments, the throttling component 110 is implemented outside of the cloud orchestrator 100. For example, the throttling component 110 may be implemented by an electronic device that is communicatively coupled to the cloud orchestrator 100. In one embodiment, the throttling component 110 (or other component of the cloud orchestrator 100) allows owners of virtual applications 150 to indicate whether one or more of their virtual applications 150 can be throttled in the event that one or more physical resources 170 upon which the virtual applications run is being overutilized. Such indications can be received through a graphical user interface (GUI), command line interface, an application programming interface (API), a messaging interface or other input means. The threshold for when a physical resource 170 is being overutilized can be defined by the cloud operator or other entity, as desired. Virtual applications 150 that are allowed to be throttled are added to the throttling subscription registry 120 (such virtual applications 150 are said to be subscribed to the throttling subscription registry 120). In one embodiment, the throttling subscription registry 120 is implemented using a database (e.g., a relational database). While the throttling subscription registry 120 is shown as being implemented in the cloud orchestrator 100, in other embodiments, the throttling subscription registry 120 is implemented outside of the cloud orchestrator 100. For example, the throttling subscription registry may be implemented by a relational database that is accessible to the cloud orchestrator 100 (e.g., over a network connection). As used herein, the term "throttling" generally refers to adjusting the amount of physical resources 170 that are utilized (e.g., by a virtual application 150). In a public cloud deployment, the cloud operator might offer an owner of a virtual application 150 a financial incentive to subscribe their virtual application 150 to the throttling subscription registry 120 (e.g., by offering discounted rates). In a private cloud deployment, where there may be no rates to be discounted, there are still benefits to subscribing virtual applications 150 to the throttling subscription registry 120. For example, this may provide the owner (e.g., a network administrator or operator) with the flexibility to prioritize certain virtual applications 150 and/or identify virtual applications 150 that can be throttled with minimum disruption to end users.

In one embodiment, when an owner of a virtual application 150 subscribes their virtual application 150 to the throttling subscription registry 120, the throttling component 110 also allows the owner to specify the throttling mechanism by which to throttle the virtual application 150. In one embodiment, the throttling mechanism is a mechanism that can be dynamically initiated or carried out by the cloud orchestrator 100 when a physical resource 170 that is being utilized by the virtual application 150 is being overutilized (e.g., due to a usage spike). The throttling mechanism can take various approaches to throttle the virtual application 150. For example, the throttling mechanism may involve sending a message directly to one or more of the VMs 160 that are associated with the virtual application 150. In this case, the VMs 160 may include a service to receive the message and take appropriate action to reduce utilization of the overutilized physical resource 170. This can be accomplished, for example, by shutting down low-priority processes. As another example, the throttling mechanism may involve sending a message to a third-party system such as an element manager 130 that is responsible for actively managing the virtual application 150 or the VMs 160 associated with the virtual application 150. In this case, the element manager 130 may, upon receiving the message, execute one or more throttling actions, such as shutting down the VMs 160 utilizing the overutilized physical resource 170 (e.g., after it confirms that there are other redundant VMs 160 that can handle the workload) or migrating VMs 160 to other hosts.

The throttling mechanism can be specified in various ways. In one embodiment, the throttling mechanism is specified as a command line command (e.g., a Linux command) that the cloud orchestrator 100 can execute. For example, the command line command could be a command to send a message to the virtual application 150 (or a VM 160 associated with the virtual application 150) or the element manager 130 responsible for managing the virtual application 150 (or a VM 160 associated with the virtual application 150) (e.g., a "curl" command to send a request to a web server in the element manager 130), a command to execute a target command on a VM 160 associated with the virtual application 150 (e.g., by using "ssh" command to execute the target command on the VM 160), or a command to perform a standard cloud orchestrator function (e.g., stop or migrate a VM 160).

In one embodiment, the throttling component 110 manages the throttling subscription registry 120. The throttling subscription registry 120 keeps tracks of which virtual applications 150 have subscribed for throttling, as well as the throttling mechanism that is to be used to throttle each subscribed virtual application 150. As previously mentioned, the throttling component 110 may allow an owner of a virtual application 150 to subscribe their virtual application 150 to the throttling subscription registry 120 through a GUI (e.g., a dashboard), a command line interface, an API, a messaging interface, or other input means. In one embodiment, the throttling component 110 also allows the owner to configure certain options related to the throttling. For example, an option may be provided to only allow a virtual application 150 to be throttled within a certain timeframe (e.g., during a specified time of day, day(s) of the week, holidays, etc.), when alerts of a certain severity occur (if it is supported by the cloud orchestrator 100), and/or when other conditions are met.

In one embodiment, the throttling component 110 determines when a physical resource 170 is being overutilized or when such overutilization is anticipated. In one embodiment, predictive analytics is used to anticipate overutilization. For example, predictive analytics could anticipate that the physical network resources of a central office near a 100,000-seat stadium may become overutilized on the day of an event is to be held at the stadium. As another example, predictive analytics could anticipate that CPU resources may become overutilized based on a forecast that a heat wave is arriving, which will likely cause less CPU cycles to be available (e.g., due to the number of CPU cycles being reduced to avoid overheating). As yet another example, predictive analytics could anticipate that physical resources 170 may become overutilized based on a forecast that a storm will be arriving, which will likely reduce the availability of physical resources 170. In one embodiment, the throttling component 110 (or other component of the cloud orchestrator 100) monitors/measures the physical resource utilization in the cloud 140 and determines that a physical resource 170 is being overutilized when the utilization of that physical resource 170 crosses a pre-defined threshold. In another embodiment, a third-party performance monitor (not shown) monitors the physical resource utilization in the cloud 140. In this case, the throttling component 110 may determine that a physical resource 170 is being overutilized based on receiving a message (e.g., an alert) from the third-party performance monitor. As part of determining that a physical resource 170 is being overutilized, the throttling component 110 may also determine the specific physical resource 170 that is being overutilized as well as the severity of the overutilization (either in absolute terms, or as a labeled severity level such as "Minor," Major," and "Critical" (in order of increasing severity)). In one embodiment, the third-party performance monitor includes this information in the message (or alert) that is sent to the throttling component 110.

In one embodiment, when the throttling component 110 determines that a specific physical resource 170 is being overutilized, the throttling component 110 identifies the virtual applications 150 in the cloud 140 that utilize that physical resource 170. This may be achieved by identifying the VMs 160 that utilize that physical resource 170 and then identifying the virtual applications 150 that are associated with any one of those VMs 160. For example, if the throttling component 110 determines that a physical resource 170 (e.g., CPU or memory) corresponding to a particular physical host blade is being overutilized, the throttling component 110 identifies all of the VMs 160 that have been assigned to run on that physical host blade. For each of these VMs 160, the throttling component 110 then identifies the virtual applications 150 associated with that VM 160.

Similarly, if the throttling component 110 determines that a physical network is being overutilized (e.g., due to a spike in network bandwidth being used), the throttling component 110 identifies all of the virtual networks that utilize that physical network. For each of these virtual networks, the throttling component 110 then identifies the VMs 160 that are connected to these virtual networks. For each of these VMs 160, the throttling component 110 then identifies the virtual applications 150 associated with these VMs 160.

The throttling component 110 then determines which of the virtual applications 150 that utilize the overutilized physical resource 170 can be throttled. This determination can be made based on whether the virtual applications 150 are subscribed to the throttling subscription registry 120. For example, the throttling component 110 may determine that a virtual application 150 is to be throttled if the virtual application 150 is subscribed to the throttling subscription registry 120 and other throttling conditions are met (e.g., the severity of the overutilization is above a certain level). However, the throttling component 110 may not throttle a virtual application 150 that is not subscribed to the throttling subscription registry 120.

The throttling component 110 may throttle virtual applications 150 by executing the throttling mechanisms specified for the respective virtual applications 150 in the throttling subscription registry 120 (e.g., as specified by the owners of those virtual applications 150 at the time of subscribing their virtual applications 150 to the throttling subscription registry 120). In one embodiment, for a critical severity level of overutilization (e.g., the highest severity level), the throttling component 110 immediately executes the throttling mechanism for all or a substantial number of the virtual applications 150 that utilize the overutilized physical resource 170. In one embodiment, for a lower severity level of overutilization, the throttling component 110 waits for some period of time between executing throttling mechanisms for different virtual applications 150, and only proceeds with throttling additional virtual applications 150 if the physical resource 170 is still being overutilized (since the previous throttling may have alleviated the overutilization). In one embodiment, there may be a sliding schedule of fee reductions depending on the desired priority. For example, if an owner of a virtual application 150 elects to have only a nominal reduction in fees for electing to allow throttling of its virtual application 150, then that virtual application 150 may be one of the last virtual applications 150 to be throttled. However, an owner of a virtual application 150 electing to have a much greater discount in fees may have their virtual application 150 throttled first.

In one embodiment, executing the throttling mechanism involves passing information about the particular physical resource 170 that is being overutilized, the VMs 160 utilizing the physical resource 170, and/or the severity of the overutilization to the process that will be performing the throttling. This allows the receiving process to take appropriate action. For example, if an element manager 130 is to throttle the virtual application 150, it can use the information to identify whether there are redundant VMs 160 of the same type running on other physical resources 170, which may lead the element manager 130 to shut down or migrate the VMs 160 involved in the overutilization.

As shown in the diagram, virtual applications 150A, 150B, and 150F are subscribed to the throttling subscription registry 120. Thus, the throttling component 110 may throttle one or more of these virtual applications 150 in the event that a physical resource 170 that those virtual applications 150 (or the VMs 160 associated with those virtual applications 150) utilize becomes overutilized. The throttling component 110 may throttle these virtual applications 150 by executing the throttling mechanism for these virtual applications 150, as specified in the throttling subscription registry 120. This may involve sending messages to one or more of the VMs 160 associated with subscribed virtual applications 150 and/or sending messages to an element manager 130, which in turn carries out the appropriate throttling.

FIG. 2 is a diagram of a table representing a throttling subscription registry, according to some embodiments. Assume there are three virtual applications (VAPP-100, VAPP-200, and VAPP-300) that share the same physical blade. The table includes a "virtual application" column, a "physical resource and threshold level" column, and a "throttling command" column. The "virtual application" column indicates the subscribed virtual application 150, the "physical resource and threshold level" column indicates when the virtual application 150 is subject to throttling (e.g., in terms of the physical resource type and the threshold level), and the "throttling command" column indicates the throttling command. According to the table, VAPP-100 may be throttled if CPU utilization reaches the major threshold level (row 1) or critical threshold level (row 2). VAPP-200 is not subscribed to the throttling subscription registry 120 and thus there is no row for VAPP-200 in the table. According to the table, VAPP-300 may be throttled if CPU utilization reaches a minor, major, or critical threshold level.

In this example, if the throttling component 110 determines that CPU utilization for the blade reaches the major threshold level, the throttling component 110: (1) determines that all three virtual applications 150 (VAPP-100, VAPP-200, and VAPP-300) are affected by the resource overutilization (since they are all run on the same physical blade); (2) determines that VAPP-100 should be throttled since it is subject to throttling when CPU utilization reaches the major threshold level; (3) determines that VAPP-200 should not need to be throttled since it is not subscribed to the throttling subscription registry 120; and (4) determines that VAPP-300 should be throttled since it is subject to throttling when CPU utilization reaches the major threshold level. The throttling component 110 then throttles VAPP-100 and VAPP-300 by executing the specified throttling commands for the respective virtual applications 150 that correspond to the CPU utilization reaching the major severity level (which in this example are "curl—data config-no-gui http://element-mgr-100/services/shutdown" and "ssh admin@198.22.54.90/home/admin/shutdown_webserver.sh," respectively for VAPP-100 and VAPP-300).

While the table representing the throttling subscription registry 120 is shown as being in a particular format, different implementations may store subscription information in a different format. In one embodiment, the content of the throttling subscription registry 120 is stored using encryption to prevent exposure of sensitive data (e.g., credentials). In one embodiment, the throttling component 110 supplies additional information to the throttling commands (e.g., by replacing optional substitution variables in the command string such as "${VM}" as shown in FIG. 2).

Figure 3:
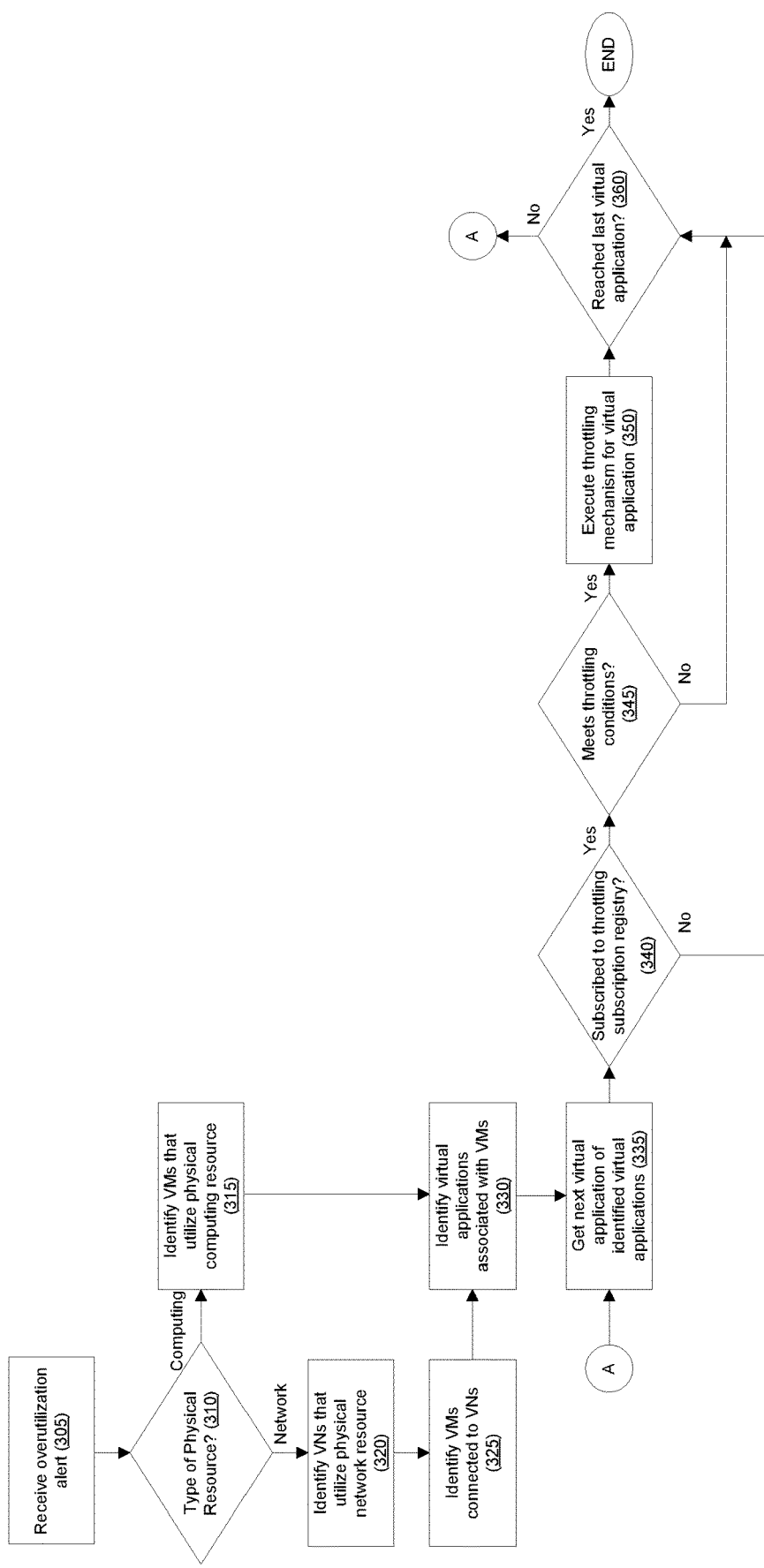
FIG. 3 is a flow diagram of a process for performing subscription-based throttling of virtual applications, according to some embodiments.

FIG. 3 is a flow diagram of a process for performing subscription-based throttling of virtual applications, according to some embodiments. In one embodiment, the process is performed by a cloud orchestrator 100 (e.g., the throttling component 110 of the cloud orchestrator 100). The operations in the flow diagrams will be described with reference to the exemplary embodiments of the other figures. However, it should be understood that the operations of the flow diagrams can be performed by embodiments other than those discussed with reference to the other figures, and the embodiments discussed with reference to these other figures can perform operations different than those discussed with reference to the flow diagrams.

In one embodiment, the process is initiated when the cloud orchestrator 100 receives an overutilization alert indicating that a particular physical resource 170 is being overutilized (block 305). The cloud orchestrator 100 then determines the type of physical resource 170 that is being overutilized (decision block 310). If the physical resource 170 being overutilized is a physical computing resource (e.g., CPU or memory), then the cloud orchestrator 100 identifies the VMs 160 that utilize that physical computing resource 170 (block 315) and identifies the virtual applications 150 that are associated with those VMs 160 (block 330). Returning to decision block 310, if the physical resource 170 being utilized is a physical network resource, then the cloud orchestrator 100 identifies the virtual networks (VNs) that utilize the physical network resource (block 320), identifies the VMs 160 connected to those virtual networks (block 325), and identifies the virtual applications 150 associated with those VMs 160 (block 330). The virtual applications 150 that are identified in block 330 are the virtual applications 150 that utilize the overutilized physical resource 170. In blocks 335-360, the cloud orchestrator 100 iterates through these virtual applications 150 to determine which of them can be throttled.

The cloud orchestrator 100 gets the next virtual application 150 of the identified virtual applications 150 (block 335). For the first time block 335 is reached, the cloud orchestrator 100 gets the first virtual application 150 of the identified virtual applications 150. The cloud orchestrator 100 checks whether the current virtual application 150 is subscribed to the throttling subscription registry 120 (decision block 340). If not, then this virtual application 150 is not to be throttled and the cloud orchestrator 100 checks whether it has reached the last virtual application 150 of the identified virtual applications 150 (decision block 360) (i.e., whether it has iterated through every virtual application 150 from the virtual applications 150 identified in block 330). If it has reached the last virtual application 150, then the process ends. Otherwise, the process returns to block 335 where the cloud orchestrator 100 gets the next virtual application 150 to perform blocks 335-360 for that virtual application 150, as needed.

Returning to decision block 340, if the current virtual application 150 is subscribed to the throttling subscription registry 120, the cloud orchestrator 100 checks whether the throttling conditions for the current virtual application 150 are met (e.g., whether the severity of the overutilization has reached a certain level) (decision block 345). If not, then the virtual application 150 is not be throttled and the cloud orchestrator 100 checks whether it has reached the last virtual application 150 of the identified virtual applications 150 (decision block 360). If it has reached the last virtual application 150, then the process ends. Otherwise, the process returns to block 335 where the cloud orchestrator 100 gets the next virtual application 150 to perform blocks 335-360 for that virtual application 150, as needed.

Returning to decision block 345, if the throttling conditions for the current virtual application 150 are met, then the cloud orchestrator 100 executes the throttling mechanism for that virtual application 150 (e.g., as specified in the throttling subscription registry 120) (block 350). The cloud orchestrator 100 then checks whether it has reached the last virtual application 150 of the identified virtual applications 150 (decision block 360). If it has reached the last virtual application 150, then the process ends. Otherwise, the process returns to block 335 where the cloud orchestrator 100 gets the next virtual application 150 to perform blocks 335-360 for that virtual application 150, as needed.

Figure 4:
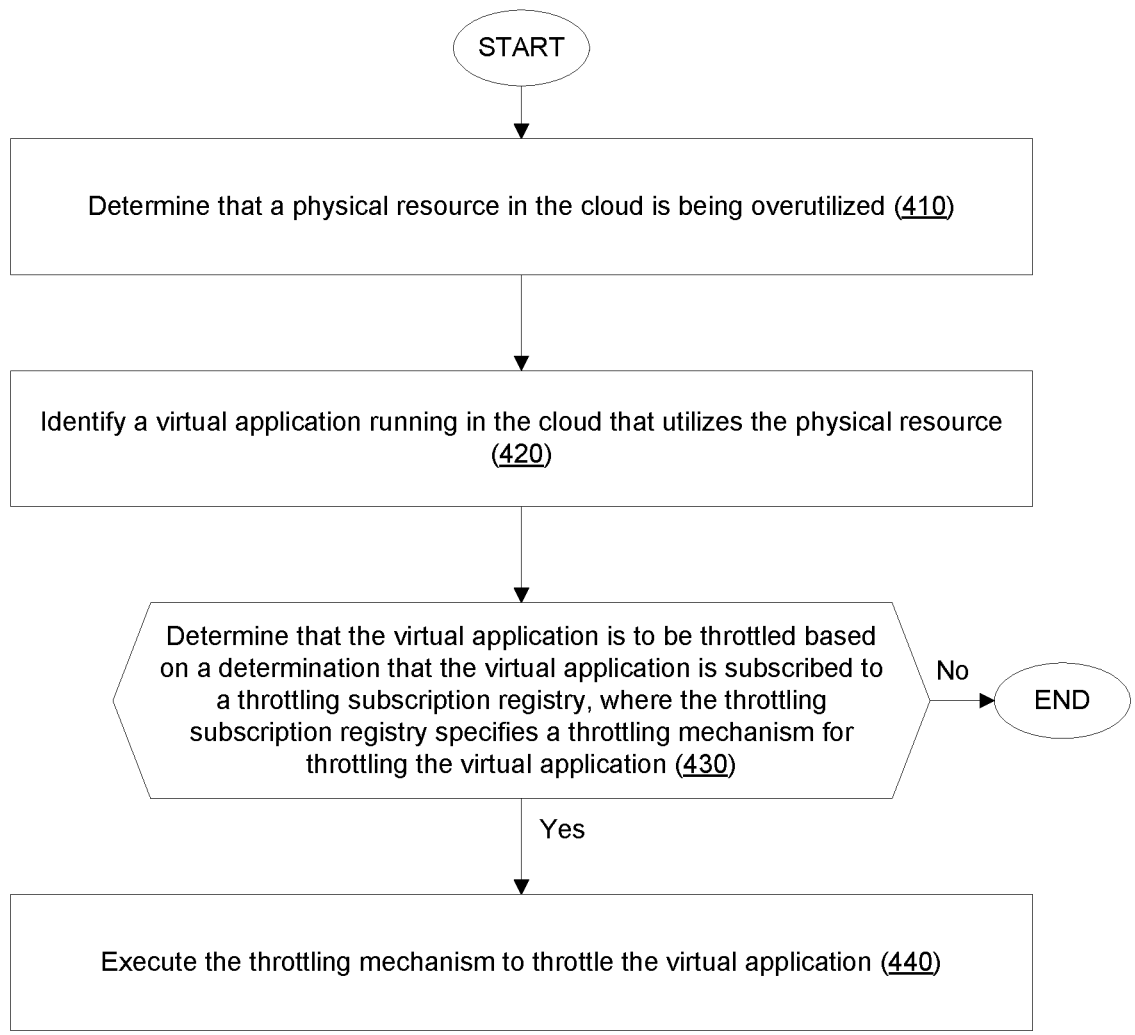
FIG. 4 is a flow diagram of another process for performing subscription-based throttling of virtual applications, according to some embodiments.

FIG. 4 is a flow diagram of another process for performing subscription-based throttling of virtual applications, according to some embodiments. In one embodiment, the process is performed by a cloud orchestrator 100 (e.g., the throttling component 110 of the cloud orchestrator 100). The process is a more general process than the process shown in FIG. 3.

In one embodiment, the process is initiated when the cloud orchestrator 100 determines that a physical resource 170 in the cloud 140 is being overutilized (block 410). In one embodiment, the cloud orchestrator 100 determines that the physical resource 170 in the cloud 140 is being overutilized based on receiving a message indicating that the physical resource 170 is being overutilized (e.g., from a third-party performance monitor). In one embodiment, the physical resource 170 can be a physical computing resource, a physical memory/storage resource, or a physical network resource. In one embodiment, the cloud orchestrator 100 determines that the physical resource 170 in the cloud 140 is being overutilized based on actively monitoring utilization of the physical resource 170 (e.g., the cloud orchestrator 100 could perform the monitoring itself or query a third-party performance monitor) and determining that the utilization of the physical resource 170 meets or exceeds a threshold level.

The cloud orchestrator 100 identifies a virtual application 150 running in the cloud 140 that utilizes the physical resource 170 (block 420). In one embodiment, the cloud orchestrator 100 identifies the virtual application 150 running in the cloud 140 that utilizes the physical resource 170 based on identifying VMs 160 that utilize the physical resource 170 and identifying that the virtual application 150 is associated with one of the VMs 160 that utilize the physical resource 170.

The cloud orchestrator 100 determines whether the virtual application 150 is to be throttled based on a determination of whether the virtual application 150 is subscribed to a throttling subscription registry 120, where the throttling subscription registry 120 specifies a throttling mechanism by which to throttle the virtual application 150 (decision block 430). In one embodiment, the cloud orchestrator 100 determines that the virtual application 150 is to be throttled further based on a determination that one or more throttling conditions specified by the throttling subscription registry 120 for the virtual application 150 are met. In this embodiment, the one or more throttling conditions may include a condition that a severity of overutilization meets or exceeds a threshold level. In one embodiment, the cloud orchestrator 100 receives a request to subscribe the virtual application 150 to the throttling subscription registry 120 (e.g., from the owner of the virtual application 150 through a GUI, a command line interface, an API, a messaging interface, or other input means) and in response to this request subscribes the virtual application 150 to the throttling subscription registry 120. In one embodiment, the throttling mechanism includes sending a message to one or more VMs 160 associated with the virtual application 150. In one embodiment, the throttling mechanism includes sending a message to an element manager 130 that is responsible for managing the virtual application 150. In one embodiment, the throttling subscription registry 120 specifies a command line command (e.g., Linux command) to execute to throttle the virtual application 150. If the virtual application 150 is to be throttled, then the cloud orchestrator 100 executes the throttling mechanism to throttle the virtual application 150 (block 440). However, if the virtual application 150 is not be throttled, then the process ends.

Embodiments described herein allow owners to voluntarily subscribe their virtual applications 150 to a throttling subscription registry 120. When it is determined that a physical resource 170 is being overutilized, the cloud orchestrator 100 can consult the throttling subscription registry 120 to quickly (and in an automated way) identify virtual applications 150 that can be throttled to alleviate the overutilization. For example, embodiments may be used to identify virtual applications 150 that, if throttled, minimally disrupt the customer end-to-end service. This can be achieved, for example, by subscribing low priority virtual applications 150 to the throttling subscription registry 120, but excluding high priority virtual applications 150 from the throttling subscription registry 120 (or subscribing both, but configuring the subscriptions such that the high priority virtual applications 150 are only throttled for higher severity levels). Embodiments can be used to reduce congestion quickly (e.g., without having to perform a root cause analysis to find the particular misbehaving VM 160) and give the cloud provider time to investigate the cause of the physical resource overutilization and to implement other solutions to address misbehaving VMs 160 or other misbehaving resources.

As mentioned above, embodiments utilize a throttling subscription registry 120. In many cases, the cloud orchestrator 100 already maintains an up-to-date inventory of the deployed virtual resources. The cloud orchestrator 100 can leverage this information along with the throttling subscription registry 120 to quickly and automatically address physical resource overutilization and/or congestion events.

Embodiments provide a multi-tiered throttling approach based on priority and criticality. In many cases, the cloud orchestrator 100 already monitors the performance/status of the shared physical resources 170 in the cloud 140 and has established various severity levels such as "warning" and "critical" or 75% and 80%. Embodiments can build upon this infrastructure and allow the virtual applications 150 to be throttled differently depending on the severity level. Also, embodiments allow for specifying the throttling mechanism on a per-application basis. Thus, the cloud provider can use the cloud orchestrator 100 to automatically apply application-specific throttling mechanisms to selected virtual applications 150 or workloads at specific resource utilization levels.

Embodiments provide an algorithm to automate throttling of virtual applications 150 without operator intervention. Conventional techniques typically address overutilization by trying to identify the misbehaving VM 160 (or other virtual resource). However, such techniques have an inherent risk, as it may take some time to identify the misbehaving VM 160, and the identification process itself may be hampered by the overutilization. Also, while the identification is in process, the overutilization can become worse or even spread. Thus, identifying and throttling the misbehaving VM 160 may not always be the preferred solution to address the overutilization. Depending on the customer's end-to-end service scenario, it may be preferable to allow some virtual resources to exceed their normal operating parameters in certain conditions and/or at certain times, and throttle other low-priority virtual applications 150 or workloads. Embodiments can mitigate the risks inherent in conventional techniques by first taking actions with a known and acceptable impact on customer end-to-end services, and then proceeding with more invasive and service-disrupting methods if the actions do not sufficiently reduce the overutilization.

As mentioned above, embodiments allow owners of virtual applications 150 to voluntarily subscribe their virtual applications 150 to the throttling subscription registry 120 and to specify the throttling mechanism by which to throttle each virtual application 150. This provides a fine-grained and customizable approach to throttling. Since the owner is in the best position to determine how to reduce resource utilization without affecting its performance (or minimally impacting performance), embodiments may be used to achieve throttling with minimal disruption. Also, embodiments do not require each virtual application vendor to disclose the technical details and proprietary methods used to achieve the desired level of throttling. Vendors can publish an interface or procedure to invoke for a given overutilization scenario and the cloud orchestrator 100 can invoke the published interface or procedure on a per-application basis for different overutilization scenarios.

Embodiments do not limit the types of actions that may be used to implement throttling and minimizes the impact on end-to-end services. Embodiments can specify a broad set of actions at multiple levels including invoking operations available from the cloud orchestrator 100 itself. For example, depending on the virtual application 150, it may be best to transfer workloads to a redundant VM 160 running on a non-congested physical resource 170 and stop the VM 160 running on the congested physical resource 170, stop non-critical processes on a VM 160, defer certain housekeeping/operations tasks, scale out VMs 160 on non-congested physical resources 170 and delete VMs 160 on the congested physical resource 170, and/or if there are multiple virtual applications 150 of the same type, transfer workloads to virtual applications 150 running on a non-congested physical resource 170.

Figure 5A:
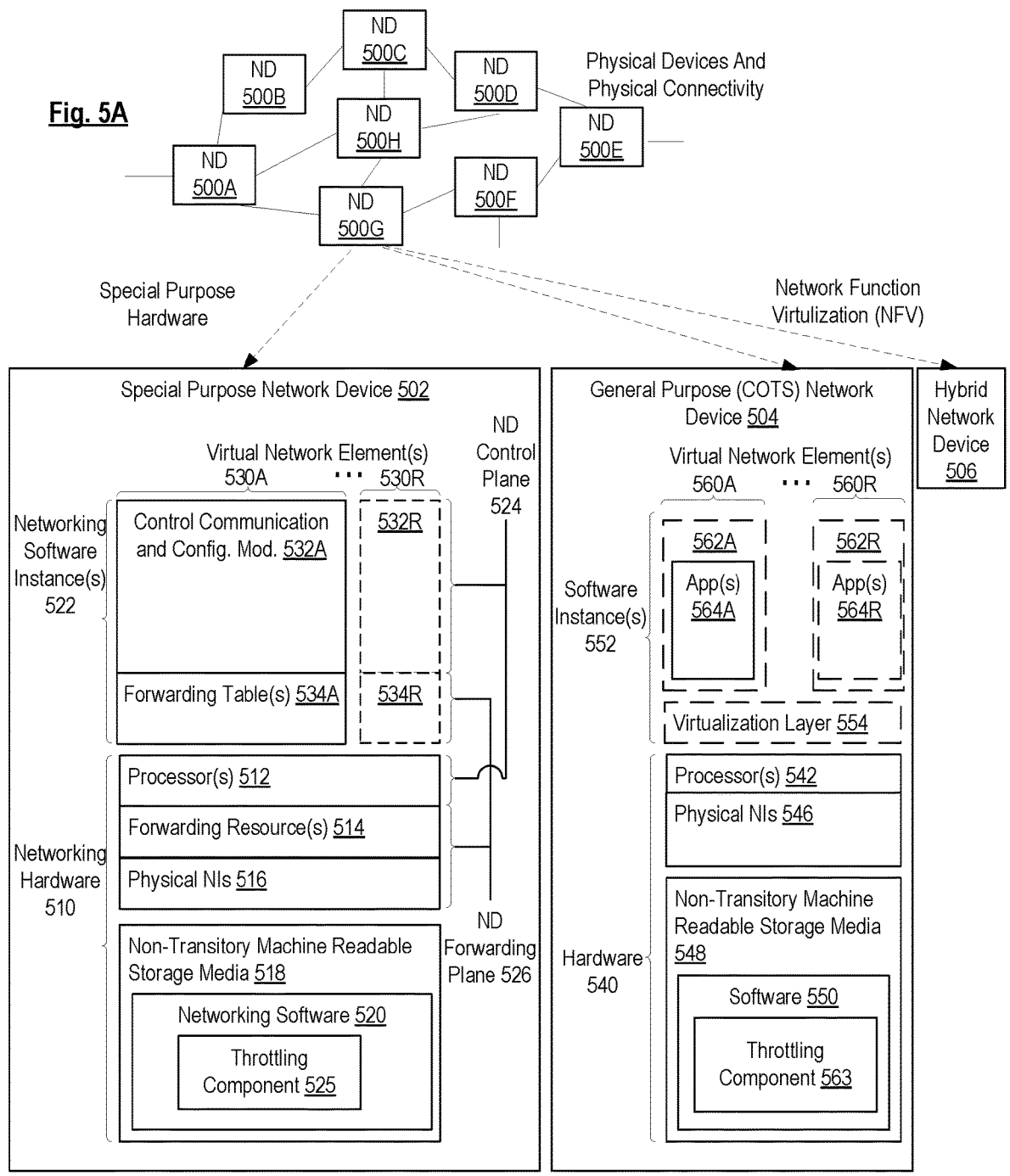
FIG. 5A illustrates connectivity between network devices (NDs) within an exemplary network, as well as three exemplary implementations of the NDs, according to some embodiments.

FIG. 5A illustrates connectivity between network devices (NDs) within an exemplary network, as well as three exemplary implementations of the NDs, according to some embodiments. FIG. 5A shows NDs 500A-H, and their connectivity by way of lines between 500A-500B, 500B-500C, 500C-500D, 500D-500E, 500E-500F, 500F-500G, and 500A-500G, as well as between 500H and each of 500A, 500C, 500D, and 500G. These NDs are physical devices, and the connectivity between these NDs can be wireless or wired (often referred to as a link). An additional line extending from NDs 500A, 500E, and 500F illustrates that these NDs act as ingress and egress points for the network (and thus, these NDs are sometimes referred to as edge NDs; while the other NDs may be called core NDs).

Two of the exemplary ND implementations in FIG. 5A are: 1) a special-purpose network device 502 that uses custom application—specific integrated—circuits (ASICs) and a special-purpose operating system (OS); and 2) a general purpose network device 504 that uses common off-the-shelf (COTS) processors and a standard OS.

The special-purpose network device 502 includes networking hardware 510 comprising a set of one or more processor(s) 512, forwarding resource(s) 514 (which typically include one or more ASICs and/or network processors), and physical network interfaces (NIs) 516 (through which network connections are made, such as those shown by the connectivity between NDs 500A-H), as well as non-transitory machine readable storage media 518 having stored therein networking software 520. During operation, the networking software 520 may be executed by the networking hardware 510 to instantiate a set of one or more networking software instance(s) 522. Each of the networking software instance(s) 522, and that part of the networking hardware 510 that executes that network software instance (be it hardware dedicated to that networking software instance and/or time slices of hardware temporally shared by that networking software instance with others of the networking software instance(s) 522), form a separate virtual network element 530A-R. Each of the virtual network element(s) (VNEs) 530A-R includes a control communication and configuration module 532A-R (sometimes referred to as a local control module or control communication module) and forwarding table(s) 534A-R, such that a given virtual network element (e.g., 530A) includes the control communication and configuration module (e.g., 532A), a set of one or more forwarding table(s) (e.g., 534A), and that portion of the networking hardware 510 that executes the virtual network element (e.g., 530A).

Software 520 can include code such as throttling component 525, which when executed by networking hardware 510, causes the special-purpose network device 502 to perform operations of one or more embodiments described herein above as part networking software instances 522.

The special-purpose network device 502 is often physically and/or logically considered to include: 1) a ND control plane 524 (sometimes referred to as a control plane) comprising the processor(s) 512 that execute the control communication and configuration module(s) 532A-R; and 2) a ND forwarding plane 526 (sometimes referred to as a forwarding plane, a data plane, or a media plane) comprising the forwarding resource(s) 514 that utilize the forwarding table(s) 534A-R and the physical NIs 516. By way of example, where the ND is a router (or is implementing routing functionality), the ND control plane 524 (the processor(s) 512 executing the control communication and configuration module(s) 532A-R) is typically responsible for participating in controlling how data (e.g., packets) is to be routed (e.g., the next hop for the data and the outgoing physical NI for that data) and storing that routing information in the forwarding table(s) 534A-R, and the ND forwarding plane 526 is responsible for receiving that data on the physical NIs 516 and forwarding that data out the appropriate ones of the physical NIs 516 based on the forwarding table(s) 534A-R.

Figure 5B:
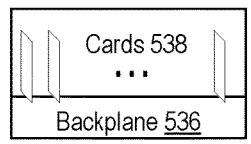
FIG. 5B illustrates an exemplary way to implement a special-purpose network device according to some embodiments.

FIG. 5B illustrates an exemplary way to implement the special-purpose network device 502 according to some embodiments. FIG. 5B shows a special-purpose network device including cards 538 (typically hot pluggable). While in some embodiments the cards 538 are of two types (one or more that operate as the ND forwarding plane 526 (sometimes called line cards), and one or more that operate to implement the ND control plane 524 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 536 (e.g., a first full mesh coupling the line cards and a second full mesh coupling all of the cards).

Returning to FIG. 5A, the general purpose network device 504 includes hardware 540 comprising a set of one or more processor(s) 542 (which are often COTS processors) and physical NIs 546, as well as non-transitory machine readable storage media 548 having stored therein software 550. During operation, the processor(s) 542 execute the software 550 to instantiate one or more sets of one or more applications 564A-R. While one embodiment does not implement virtualization, alternative embodiments may use different forms of virtualization. For example, in one such alternative embodiment the virtualization layer 554 represents the kernel of an operating system (or a shim executing on a base operating system) that allows for the creation of multiple instances 562A-R called software containers that may each be used to execute one (or more) of the sets of applications 564A-R; where the multiple software containers (also called virtualization engines, virtual private servers, or jails) are user spaces (typically a virtual memory space) that are separate from each other and separate from the kernel space in which the operating system is run; and where the set of applications running in a given user space, unless explicitly allowed, cannot access the memory of the other processes. In another such alternative embodiment the virtualization layer 554 represents a hypervisor (sometimes referred to as a virtual machine monitor (VMM)) or a hypervisor executing on top of a host operating system, and each of the sets of applications 564A-R is run on top of a guest operating system within an instance 562A-R called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 540, directly on a hypervisor (in which case the unikernel is sometimes described as running within a LibOS virtual machine), or in a software container, embodiments can be implemented fully with unikernels running directly on a hypervisor represented by virtualization layer 554, unikernels running within software containers represented by instances 562A-R, or as a combination of unikernels and the above-described techniques (e.g., unikernels and virtual machines both run directly on a hypervisor, unikernels and sets of applications that are run in different software containers).

The instantiation of the one or more sets of one or more applications 564A-R, as well as virtualization if implemented, are collectively referred to as software instance(s) 552. Each set of applications 564A-R, corresponding virtualization construct (e.g., instance 562A-R) if implemented, and that part of the hardware 540 that executes them (be it hardware dedicated to that execution and/or time slices of hardware temporally shared), forms a separate virtual network element(s) 560A-R.

The virtual network element(s) 560A-R perform similar functionality to the virtual network element(s) 530A-R—e.g., similar to the control communication and configuration module(s) 532A and forwarding table(s) 534A (this virtualization of the hardware 540 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). While embodiments are illustrated with each instance 562A-R corresponding to one VNE 560A-R, alternative embodiments may implement this correspondence at a finer level granularity (e.g., line card virtual machines virtualize line cards, control card virtual machine virtualize control cards, etc.); it should be understood that the techniques described herein with reference to a correspondence of instances 562A-R to VNEs also apply to embodiments where such a finer level of granularity and/or unikernels are used.

In certain embodiments, the virtualization layer 554 includes a virtual switch that provides similar forwarding services as a physical Ethernet switch. Specifically, this virtual switch forwards traffic between instances 562A-R and the physical NI(s) 546, as well as optionally between the instances 562A-R; in addition, this virtual switch may enforce network isolation between the VNEs 560A-R that by policy are not permitted to communicate with each other (e.g., by honoring virtual local area networks (VLANs)).

Software 550 can include code such as throttling component 563, which when executed by processor(s) 542, cause the general purpose network device 504 to perform operations of one or more embodiments described herein above as part software instances 562A-R.

The third exemplary ND implementation in FIG. 5A is a hybrid network device 506, which includes both custom ASICs/special-purpose OS and COTS processors/standard OS in a single ND or a single card within an ND. In certain embodiments of such a hybrid network device, a platform VM (i.e., a VM that that implements the functionality of the special-purpose network device 502) could provide for para-virtualization to the networking hardware present in the hybrid network device 506.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 530A-R, VNEs 560A-R, and those in the hybrid network device 506) receives data on the physical NIs (e.g., 516, 546) and forwards that data out the appropriate ones of the physical NIs (e.g., 516, 546). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services code point (DSCP) values.

Figure 5C:
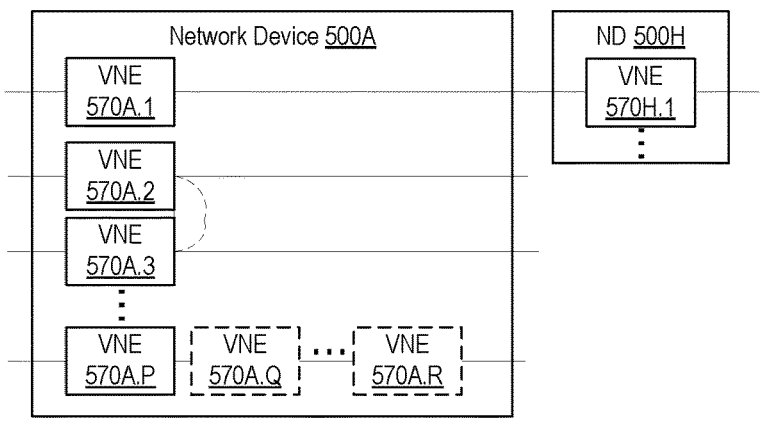
FIG. 5C illustrates various exemplary ways in which virtual network elements (VNEs) may be coupled according to some embodiments.

FIG. 5C illustrates various exemplary ways in which VNEs may be coupled according to some embodiments. FIG. 5C shows VNEs 570A.1-570A.P (and optionally VNEs 570A.Q-570A.R) implemented in ND 500A and VNE 570H.1 in ND 500H. In FIG. 5C, VNEs 570A.1-P are separate from each other in the sense that they can receive packets from outside ND 500A and forward packets outside of ND 500A; VNE 570A.1 is coupled with VNE 570H.1, and thus they communicate packets between their respective NDs; VNE 570A.2-570A.3 may optionally forward packets between themselves without forwarding them outside of the ND 500A; and VNE 570A.P may optionally be the first in a chain of VNEs that includes VNE 570A.Q followed by VNE 570A.R (this is sometimes referred to as dynamic service chaining, where each of the VNEs in the series of VNEs provides a different service—e.g., one or more layer 4-7 network services). While FIG. 5C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 5A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 5A may also host one or more such servers (e.g., in the case of the general purpose network device 504, one or more of the software instances 562A-R may operate as servers; the same would be true for the hybrid network device 506; in the case of the special-purpose network device 502, one or more such servers could also be run on a virtualization layer executed by the processor(s) 512); in which case the servers are said to be co-located with the VNEs of that ND.

A virtual network is a logical abstraction of a physical network (such as that in FIG. 5A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

Figure 5D:
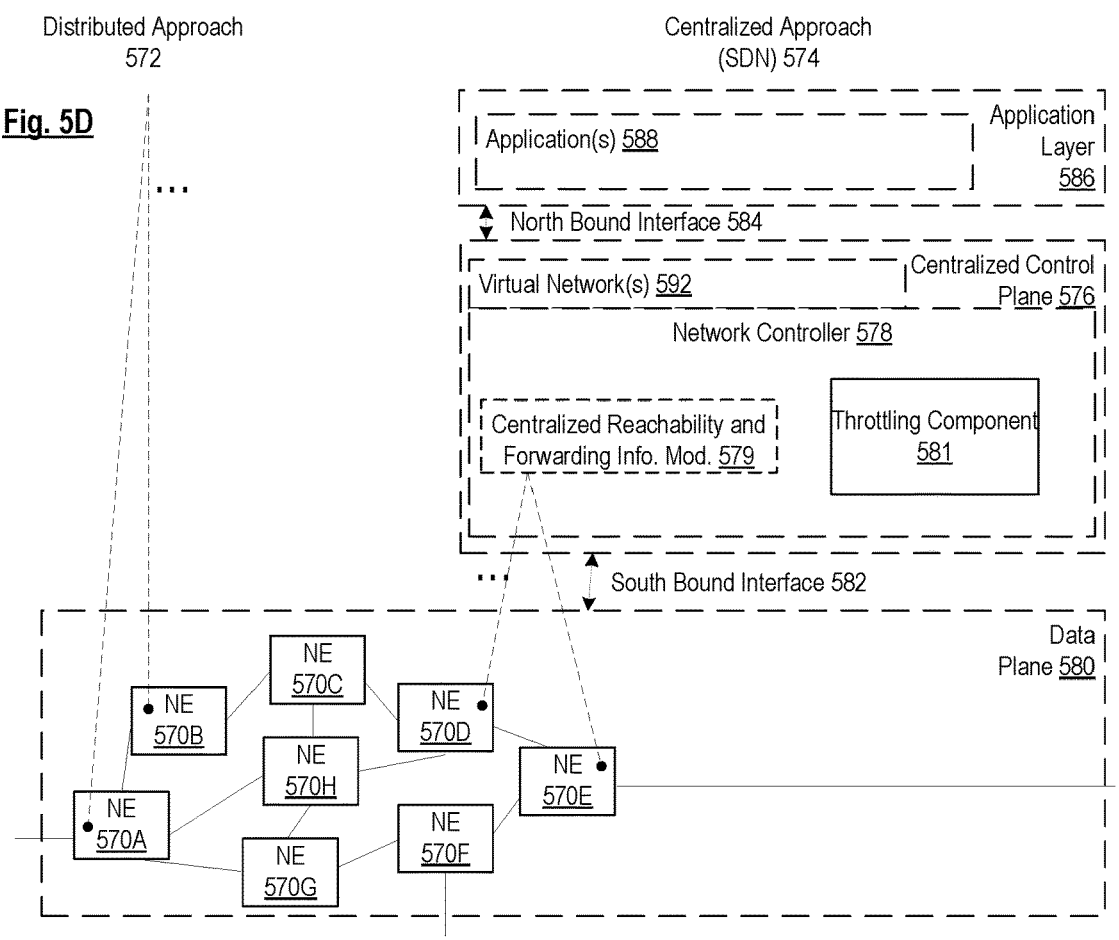
FIG. 5D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments.

FIG. 5D illustrates a network with a single network element on each of the NDs of FIG. 5A, and within this straight forward approach contrasts a traditional distributed approach (commonly used by traditional routers) with a centralized approach for maintaining reachability and forwarding information (also called network control), according to some embodiments. Specifically, FIG. 5D illustrates network elements (NEs) 570A-H with the same connectivity as the NDs 500A-H of FIG. 5A.

FIG. 5D illustrates that the distributed approach 572 distributes responsibility for generating the reachability and forwarding information across the NEs 570A-H; in other words, the process of neighbor discovery and topology discovery is distributed.

For example, where the special-purpose network device 502 is used, the control communication and configuration module(s) 532A-R of the ND control plane 524 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP), Label Distribution Protocol (LDP), Resource Reservation Protocol (RSVP) (including RSVP-Traffic Engineering (TE): Extensions to RSVP for LSP Tunnels and Generalized Multi-Protocol Label Switching (GMPLS) Signaling RSVP-TE)) that communicate with other NEs to exchange routes, and then selects those routes based on one or more routing metrics. Thus, the NEs 570A-H (e.g., the processor(s) 512 executing the control communication and configuration module(s) 532A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 524. The ND control plane 524 programs the ND forwarding plane 526 with information (e.g., adjacency and route information) based on the routing structure(s). For example, the ND control plane 524 programs the adjacency and route information into one or more forwarding table(s) 534A-R (e.g., Forwarding Information Base (FIB), Label Forwarding Information Base (LFIB), and one or more adjacency structures) on the ND forwarding plane 526. For layer 2 forwarding, the ND can store one or more bridging tables that are used to forward data based on the layer 2 information in that data. While the above example uses the special-purpose network device 502, the same distributed approach 572 can be implemented on the general purpose network device 504 and the hybrid network device 506.

FIG. 5D illustrates that a centralized approach 574 (also known as software defined networking (SDN)) that decouples the system that makes decisions about where traffic is sent from the underlying systems that forwards traffic to the selected destination. The illustrated centralized approach 574 has the responsibility for the generation of reachability and forwarding information in a centralized control plane 576 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 576 has a south bound interface 582 with a data plane 580 (sometime referred to the infrastructure layer, network forwarding plane, or forwarding plane (which should not be confused with a ND forwarding plane)) that includes the NEs 570A-H (sometimes referred to as switches, forwarding elements, data plane elements, or nodes). The centralized control plane 576 includes a network controller 578, which includes a centralized reachability and forwarding information module 579 that determines the reachability within the network and distributes the forwarding information to the NEs 570A-H of the data plane 580 over the south bound interface 582 (which may use the OpenFlow protocol). Thus, the network intelligence is centralized in the centralized control plane 576 executing on electronic devices that are typically separate from the NDs.

In one embodiment, the network controller 578 may include a throttling component 581 that when executed by the network controller 578, causes the network controller 578 to perform operations of one or more embodiments described herein above.

For example, where the special-purpose network device 502 is used in the data plane 580, each of the control communication and configuration module(s) 532A-R of the ND control plane 524 typically include a control agent that provides the VNE side of the south bound interface 582. In this case, the ND control plane 524 (the processor(s) 512 executing the control communication and configuration module(s) 532A-R) performs its responsibility for participating in controlling how data (e.g., packets) is to be routed (e.g., the next hop for the data and the outgoing physical NI for that data) through the control agent communicating with the centralized control plane 576 to receive the forwarding information (and in some cases, the reachability information) from the centralized reachability and forwarding information module 579 (it should be understood that in some embodiments, the control communication and configuration module(s) 532A-R, in addition to communicating with the centralized control plane 576, may also play some role in determining reachability and/or calculating forwarding information—albeit less so than in the case of a distributed approach; such embodiments are generally considered to fall under the centralized approach 574, but may also be considered a hybrid approach).

While the above example uses the special-purpose network device 502, the same centralized approach 574 can be implemented with the general purpose network device 504 (e.g., each of the VNE 560A-R performs its responsibility for controlling how data (e.g., packets) is to be routed (e.g., the next hop for the data and the outgoing physical NI for that data) by communicating with the centralized control plane 576 to receive the forwarding information (and in some cases, the reachability information) from the centralized reachability and forwarding information module 579; it should be understood that in some embodiments, the VNEs 560A-R, in addition to communicating with the centralized control plane 576, may also play some role in determining reachability and/or calculating forwarding information—albeit less so than in the case of a distributed approach) and the hybrid network device 506. In fact, the use of SDN techniques can enhance the NFV techniques typically used in the general purpose network device 504 or hybrid network device 506 implementations as NFV is able to support SDN by providing an infrastructure upon which the SDN software can be run, and NFV and SDN both aim to make use of commodity server hardware and physical switches.

FIG. 5D also shows that the centralized control plane 576 has a north bound interface 584 to an application layer 586, in which resides application(s) 588. The centralized control plane 576 has the ability to form virtual networks 592 (sometimes referred to as a logical forwarding plane, network services, or overlay networks (with the NEs 570A-H of the data plane 580 being the underlay network)) for the application(s) 588. Thus, the centralized control plane 576 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 5D shows the distributed approach 572 separate from the centralized approach 574, the effort of network control may be distributed differently or the two combined in certain embodiments. For example: 1) embodiments may generally use the centralized approach (SDN) 574, but have certain functions delegated to the NEs (e.g., the distributed approach may be used to implement one or more of fault monitoring, performance monitoring, protection switching, and primitives for neighbor and/or topology discovery); or 2) embodiments may perform neighbor discovery and topology discovery via both the centralized control plane and the distributed protocols, and the results compared to raise exceptions where they do not agree. Such embodiments are generally considered to fall under the centralized approach 574, but may also be considered a hybrid approach.

While FIG. 5D illustrates the simple case where each of the NDs 500A-H implements a single NE 570A-H, it should be understood that the network control approaches described with reference to FIG. 5D also work for networks where one or more of the NDs 500A-H implement multiple VNEs (e.g., VNEs 530A-R, VNEs 560A-R, those in the hybrid network device 506). Alternatively or in addition, the network controller 578 may also emulate the implementation of multiple VNEs in a single ND. Specifically, instead of (or in addition to) implementing multiple VNEs in a single ND, the network controller 578 may present the implementation of a VNE/NE in a single ND as multiple VNEs in the virtual networks 592 (all in the same one of the virtual network(s) 592, each in different ones of the virtual network(s) 592, or some combination). For example, the network controller 578 may cause an ND to implement a single VNE (a NE) in the underlay network, and then logically divide up the resources of that NE within the centralized control plane 576 to present different VNEs in the virtual network(s) 592 (where these different VNEs in the overlay networks are sharing the resources of the single VNE/NE implementation on the ND in the underlay network).

Figure 5E:
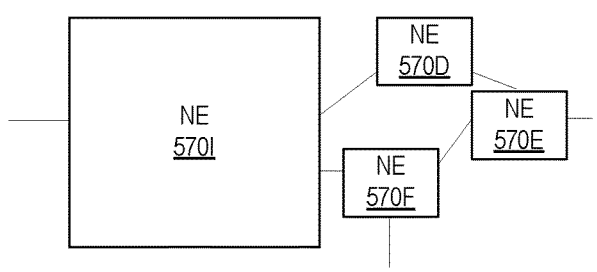
FIG. 5E illustrates the simple case of where each of the NDs implements a single NE, but a centralized control plane has abstracted multiple of the NEs in different NDs into (to represent) a single NE in one of the virtual network(s), according to some embodiments.
Figure 5F:
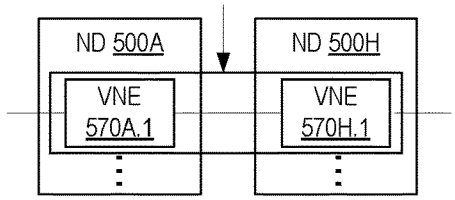
FIG. 5F illustrates a case where multiple VNEs are implemented on different NDs and are coupled to each other, and where a centralized control plane has abstracted these multiple VNEs such that they appear as a single VNE within one of the virtual networks, according to some embodiments.

On the other hand, FIGS. 5E and 5F respectively illustrate exemplary abstractions of NEs and VNEs that the network controller 578 may present as part of different ones of the virtual networks 592. FIG. 5E illustrates the simple case of where each of the NDs 500A-H implements a single NE 570A-H (see FIG. 5D), but the centralized control plane 576 has abstracted multiple of the NEs in different NDs (the NEs 570A-C and G-H) into (to represent) a single NE 5701 in one of the virtual network(s) 592 of FIG. 5D, according to some embodiments. FIG. 5E shows that in this virtual network, the NE 5701 is coupled to NE 570D and 570F, which are both still coupled to NE 570E.

FIG. 5F illustrates a case where multiple VNEs (VNE 570A.1 and VNE 570H.1) are implemented on different NDs (ND 500A and ND 500H) and are coupled to each other, and where the centralized control plane 576 has abstracted these multiple VNEs such that they appear as a single VNE 570T within one of the virtual networks 592 of FIG. 5D, according to some embodiments. Thus, the abstraction of a NE or VNE can span multiple NDs.

While some embodiments implement the centralized control plane 576 as a single entity (e.g., a single instance of software running on a single electronic device), alternative embodiments may spread the functionality across multiple entities for redundancy and/or scalability purposes (e.g., multiple instances of software running on different electronic devices).

Figure 6:
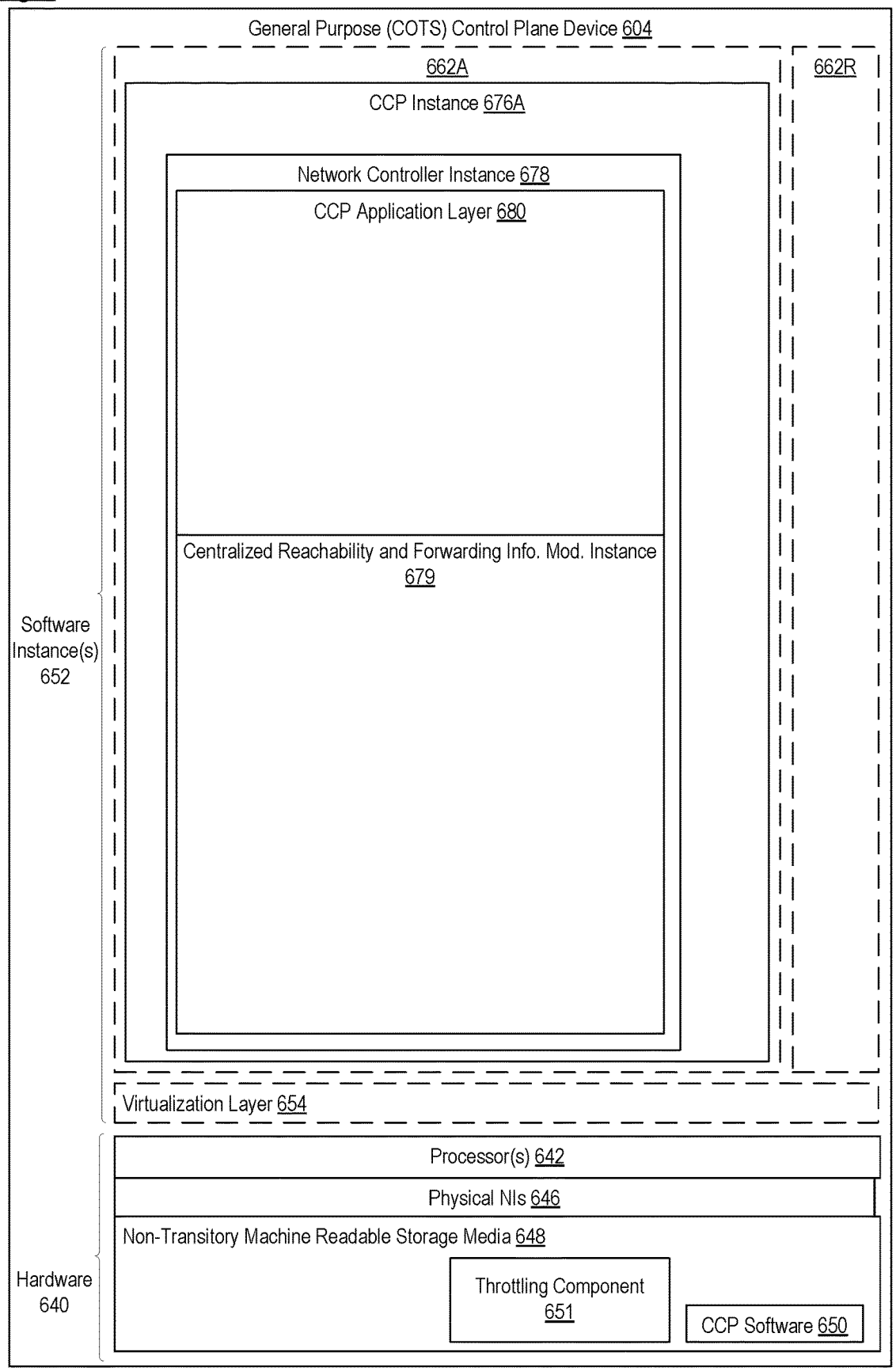
FIG. 6 illustrates a general purpose control plane device with centralized control plane (CCP) software, according to some embodiments.

Similar to the network device implementations, the electronic device(s) running the centralized control plane 576, and thus the network controller 578 including the centralized reachability and forwarding information module 579, may be implemented a variety of ways (e.g., a special purpose device, a general-purpose (e.g., COTS) device, or hybrid device). These electronic device(s) would similarly include processor(s), a set or one or more physical NIs, and a non-transitory machine-readable storage medium having stored thereon the centralized control plane software. For instance, FIG. 6 illustrates, a general purpose control plane device 604 including hardware 640 comprising a set of one or more processor(s) 642 (which are often COTS processors) and physical NIs 646, as well as non-transitory machine readable storage media 648 having stored therein centralized control plane (CCP) software 650 and a throttling component 651.

In embodiments that use compute virtualization, the processor(s) 642 typically execute software to instantiate a virtualization layer 654 (e.g., in one embodiment the virtualization layer 654 represents the kernel of an operating system (or a shim executing on a base operating system) that allows for the creation of multiple instances 662A-R called software containers (representing separate user spaces and also called virtualization engines, virtual private servers, or jails) that may each be used to execute a set of one or more applications; in another embodiment the virtualization layer 654 represents a hypervisor (sometimes referred to as a virtual machine monitor (WM)) or a hypervisor executing on top of a host operating system, and an application is run on top of a guest operating system within an instance 662A-R called a virtual machine (which in some cases may be considered a tightly isolated form of software container) that is run by the hypervisor; in another embodiment, an application is implemented as a unikernel, which can be generated by compiling directly with an application only a limited set of libraries (e.g., from a library operating system (LibOS) including drivers/libraries of OS services) that provide the particular OS services needed by the application, and the unikernel can run directly on hardware 640, directly on a hypervisor represented by virtualization layer 654 (in which case the unikernel is sometimes described as running within a LibOS virtual machine), or in a software container represented by one of instances 662A-R). Again, in embodiments where compute virtualization is used, during operation an instance of the CCP software 650 (illustrated as CCP instance 676A) is executed (e.g., within the instance 662A) on the virtualization layer 654. In embodiments where compute virtualization is not used, the CCP instance 676A is executed, as a unikernel or on top of a host operating system, on the "bare metal" general purpose control plane device 604. The instantiation of the CCP instance 676A, as well as the virtualization layer 654 and instances 662A-R if implemented, are collectively referred to as software instance(s) 652.

In some embodiments, the CCP instance 676A includes a network controller instance 678. The network controller instance 678 includes a centralized reachability and forwarding information module instance 679 (which is a middleware layer providing the context of the network controller 578 to the operating system and communicating with the various NEs), and an CCP application layer 680 (sometimes referred to as an application layer) over the middleware layer (providing the intelligence required for various network operations such as protocols, network situational awareness, and user—interfaces). At a more abstract level, this CCP application layer 680 within the centralized control plane 576 works with virtual network view(s) (logical view(s) of the network) and the middleware layer provides the conversion from the virtual networks to the physical view.

The throttling component 651 can be executed by hardware 640 to perform operations of one or more embodiments described herein above as part of software instances 652.

The centralized control plane 576 transmits relevant messages to the data plane 580 based on CCP application layer 680 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 580 may receive different messages, and thus different forwarding information. The data plane 580 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables. Standards such as OpenFlow define the protocols used for the messages, as well as a model for processing the packets. The model for processing packets includes header parsing, packet classification, and making forwarding decisions.

Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 580, the packet (or a subset of the packet header and content) is typically forwarded to the centralized control plane 576. The centralized control plane 576 will then program forwarding table entries into the data plane 580 to accommodate packets belonging to the flow of the unknown packet. Once a specific forwarding table entry has been programmed into the data plane 580 by the centralized control plane 576, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Some portions of the preceding detailed descriptions have been presented in terms of algorithms and symbolic representations of transactions on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of transactions leading to a desired result. The transactions are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the required method transactions. The required structure for a variety of these systems will appear from the description above. In addition, embodiments of the present invention are not described with reference to any particular programming language. It will be appreciated that a variety of programming languages may be used to implement the teachings of embodiments as described herein.

An embodiment of the invention may be an article of manufacture in which a non-transitory machine-readable medium (such as microelectronic memory) has stored thereon instructions (e.g., computer code) which program one or more data processing components (generically referred to here as a "processor") to perform the operations described above. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components.

Throughout the description, embodiments of the present invention have been presented through flow diagrams. It will be appreciated that the order of transactions and transactions described in these flow diagrams are only intended for illustrative purposes and not intended as a limitation of the present invention. One having ordinary skill in the art would recognize that variations can be made to the flow diagrams without departing from the broader spirit and scope of the invention as set forth in the following claims.

In the foregoing specification, embodiments have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method by one or more network devices implementing a cloud orchestrator to provide subscription-based throttling of virtual applications in a cloud, the method comprising:
   determining that a physical resource in the cloud is being overutilized;
   identifying a plurality of virtual applications running in the cloud that utilize the physical resource including a first virtual application and a second virtual application;
   determining that the first virtual application is to be throttled but the second virtual application is not to be throttled based on a determination that the first virtual application is subscribed to a throttling subscription registry but the second virtual application is not subscribed to the throttling subscription registry, wherein the throttling subscription registry specifies a throttling mechanism by which to throttle the first virtual application; and
   executing the throttling mechanism to throttle the first virtual application in response to a determination that the first virtual application is to be throttled.

2. The method of claim 1, wherein the throttling mechanism includes sending a message to one or more virtual machines (VMs) associated with the first virtual application.

3. The method of claim 1, wherein the throttling mechanism includes sending a message to an element manager that is responsible for managing the first virtual application.

4. The method of claim 1, wherein the throttling subscription registry specifies a command line command to execute to throttle the first virtual application.

5. The method of claim 1, further comprising:
   receiving a request to subscribe the first virtual application to the throttling subscription registry; and
   subscribing the first virtual application to the throttling subscription registry in response to receiving the request.

6. The method of claim 1, wherein identifying the plurality of virtual applications running in the cloud that utilize the physical resource is based on identifying virtual machines (VMs) that utilize the physical resource and determining that each of the plurality of virtual applications is associated with at least one of the VMs that utilize the physical resource.

7. The method of claim 1, wherein determining that the first virtual application is to be throttled is further based on a determination that one or more throttling conditions specified by the throttling subscription registry for the first virtual application are met.

8. The method of claim 7, wherein the one or more throttling conditions include a condition that a severity of overutilization meets or exceeds a threshold level.

9. The method of claim 1, wherein determining that the physical resource in the cloud is being overutilized is based on receiving a message indicating that the physical resource is being overutilized.

10. The method of claim 1, wherein determining that the physical resource in the cloud is being overutilized is based on actively monitoring utilization of the physical resource and determining that the utilization of the physical resource meets or exceeds a threshold level.

11. The method of claim 1, wherein the physical resource is any one of: a physical computing resource, a physical storage resource, and a physical network resource.

12. A network device to implement a cloud orchestrator that provides subscription-based throttling of virtual applications in a cloud, the network device comprising:
a non-transitory machine-readable storage medium having stored therein a throttling component; and
a set of one or more processors to execute the throttling component to cause the network device to determine that a physical resource in the cloud is being overutilized, identify a plurality of virtual applications running in the cloud that utilize the physical resource including a first virtual application and a second virtual application, determine that the first virtual application is to be throttled but the second virtual application is not to be throttled based on a determination that the first virtual application is subscribed to a throttling subscription registry but the second virtual application is not subscribed to the throttling subscription registry, wherein the throttling subscription registry specifies a throttling mechanism by which to throttle the first virtual application, and execute the throttling mechanism to throttle the first virtual application in response to a determination that the first virtual application is to be throttled.

13. The network device of claim 12, wherein the throttling mechanism includes sending a message to one or more virtual machines (VMs) associated with the first virtual application.

14. The network device of claim 12, wherein the throttling mechanism includes sending a message to an element manager that is responsible for managing the first virtual application.

15. The network device of claim 12, wherein the throttling subscription registry specifies a command line command to execute to throttle the first virtual application.

16. A non-transitory machine-readable medium having computer code stored therein, which when executed by a set of one or more processors of a network device implementing a cloud orchestrator, causes the network device to perform operations for providing subscription-based throttling of virtual applications in a cloud, the operations comprising:
determining that a physical resource in the cloud is being overutilized;
identifying a plurality of virtual applications running in the cloud that utilize the physical resource including a first virtual application and a second virtual application;
determining that the first virtual application is to be throttled but the second virtual application is not to be throttled based on a determination that the first virtual application is subscribed to a throttling subscription registry but the second virtual application is not subscribed to the throttling subscription registry, wherein the throttling subscription registry specifies a throttling mechanism by which to throttle the first virtual application; and
executing the throttling mechanism to throttle the first virtual application in response to a determination that the first virtual application is to be throttled.

17. The non-transitory machine-readable medium of claim 16, wherein the computer code, when executed by the set of one or more processors, causes the network device to perform further operations comprising:
receiving a request to subscribe the first virtual application to the throttling subscription registry; and
subscribing the first virtual application to the throttling subscription registry in response to receiving the request.

18. The non-transitory machine-readable medium of claim 16, wherein identifying the plurality of virtual applications running in the cloud that utilize the physical resource is based on identifying virtual machines (VMs) that utilize the physical resource and determining that each of the plurality of virtual applications is associated with at least one of the VMs that utilize the physical resource.

19. The non-transitory machine-readable medium of claim 16, wherein determining that the first virtual application is to be throttled is further based on a determination that one or more throttling conditions specified by the throttling subscription registry for the first virtual application are met.

20. The non-transitory machine-readable medium of claim 19, wherein the one or more throttling conditions includes a condition that a severity of overutilization meets or exceeds a threshold level.

* * * * *